Jan. 18, 1927. 1,614,602
J. B. DAY
PISTON RING
Filed Sept. 10, 1923 2 Sheets-Sheet 1
Fig. 1
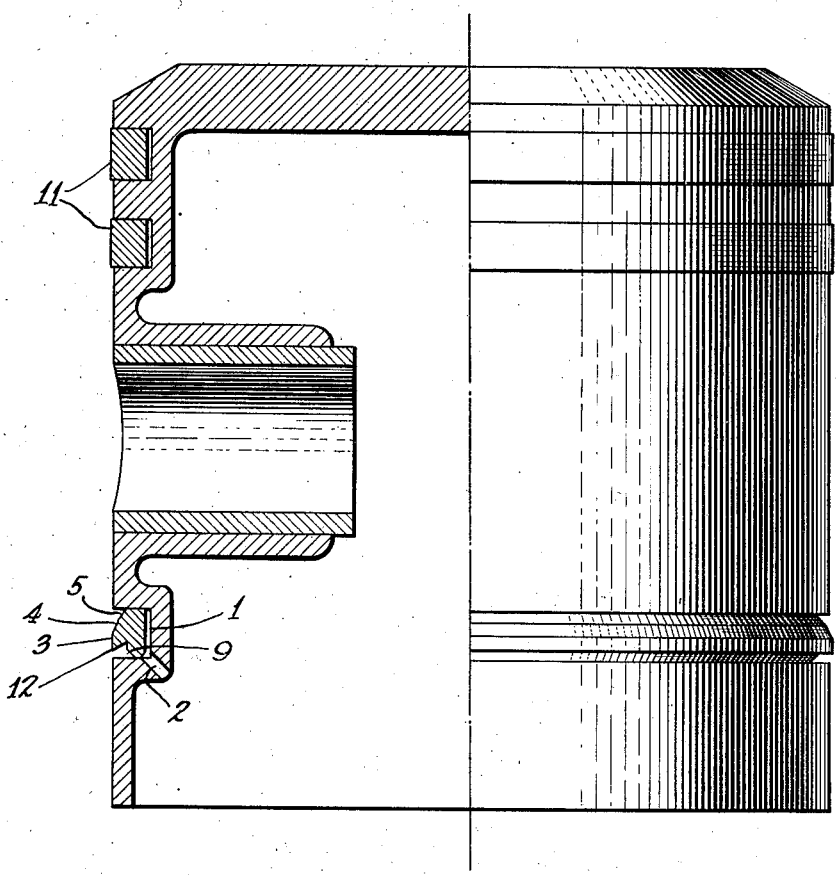
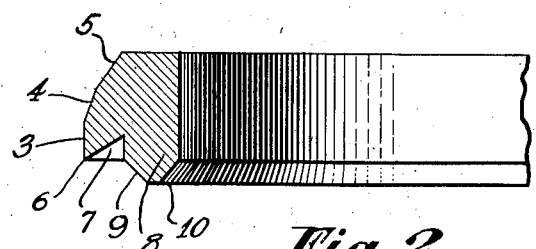
Fig. 2
INVENTOR.
James Bruce Day.
BY Jas. H. Griffin
ATTORNEYS.

Jan. 18, 1927.　　　　　　　　　　　　　　　　1,614,602
J. B. DAY
PISTON RING
Filed Sept. 10, 1923　　2 Sheets-Sheet 2

INVENTOR.
James Bruce Day
BY Jas. H. Griffin
ATTORNEYS.

UNITED STATES PATENT OFFICE.

JAMES BRUCE DAY, OF BROOKLYN, NEW YORK.

PISTON RING.

Application filed September 10, 1923. Serial No. 661,897.

This invention is a piston ring and more particularly a wiping ring adapted to be associated with a piston of an internal combustion engine to properly distribute the lubricant and at the same time preclude passage of superfluous lubricant by the piston and into the combustion chamber.

The ring which is of pronouncedly novel construction embodies several important features of advantage notably among which is the ability of the ring to properly distribute the lubricant on the up stroke of the piston and to free the cylinder from superfluous lubricant on the down stroke thereof. These advantages have been sought by practically every wiper ring heretofore proposed and while prior rings have in a measure accomplished these results with different degrees of efficiency, all of the prior rings are open to certain disadvantages, well recognized by the trade and which the present invention seeks to overcome.

In the ring of the present invention the proper distribution of lubricant on the up stroke is accomplished by forming the upper portion of the outer periphery of the ring on a bevel, preferably a double bevel; the upper portion of which makes a greater angle with the engine cylinder than the lower angle with the engine cylinder than the lower portion thereof, so that as the ring is travelling upward, the beveled portion having the greater angle will serve to lead the lubricant into the beveled portion having the lesser angle and this latter angle being pronouncedly acute will compress the oil against the cylinder wall and smooth it out in a thin filament so that the following bearing portion of the ring will be properly lubricated and the oil thoroughly and efficiently distributed over the cylinder wall. The ring is adapted moreover to so fit the piston groove that surplus oil wiped off during the up stroke will pass behind the ring and exit through relief ducts formed in the piston skirt at the base of the groove.

The bearing portion of the ring is made relatively narrow in order that the ring may be quick seating and in practice I have found that very satisfactory results can be obtained if this bearing portion is about equal to or less than one-third the height of the ring.

The bearing portion is positioned intermediate the upper and lower edges of the ring and the lower edge of said bearing portion is formed into a substantially knife edge by undercutting the outer portion of the ring so that immediately beneath the bearing portion, the ring is of reduced thickness. The base of the ring at both its inner and outer margins, is moreover chamfered or beveled, so that the lower edge of the ring is relatively thin. The purpose of this outer lower bevel edge is to permit the oil which is scraped from the cylinder wall during the downward passage of the ring therethrough to be fed directly into an annular chamber formed in the piston groove exteriorly of the ring and from the base of this chamber beneath the ring to the relief ducts formed in the piston skirt. The inner bevel is to form an inner chamber from which the surplus oil is fed to the ducts. Actual experience with a ring of this character has shown that it will efficiently wipe the oil from the cylinder wall and discharge the oil through the ducts in the piston skirt so that excess oil will not pass the piston and foul the plugs as is so commonly the case in the rings now in use.

It has heretofore been suggested to provide a wiping ring with a relatively sharp edge for wiping purposes, but my practical experience with all rings of this character has positively shown that they do not provide sufficient clearance space for the oil thus scraped free and that the space which is provided in such prior rings is so configurated that after a relatively short time they become clogged and positively refuse to function with the result that oil passes by the wiping ring and fouls the plugs as though no such ring were present.

With these considerations in mind, one of the main objects of the present invention is to provide a wiping edge well above the base of the ring so as to produce adequate relief space for the discharge of lubricant freed from the cylinder wall.

Another important object of the present invention is to provide a ring of the character specified which can be used in conventional pistons without necessitating the use of special pistons and without requiring a lot of time in the preparation of the piston for the reception of the wiping ring of this invention.

Features of the invention, other than those specified, will be apparent from the following detailed description and claim, when read in conjunction with the accompanying drawings.

The accompanying drawings illustrate one practical embodiment of the invention, but the construction therein shown is to be understood as illustrative, only, and not as defining the limits of the invention.

Figure 1 shows a piston of conventional form partly in section and partly in elevation and having a ring embodying the present invention associated therewith.

Figure 2 is an enlarged section of the wiping ring shown in Figure 1; and,

Figure 3 shows the relation of the parts during the up stroke of the piston and Figure 4 shows them during the down stroke.

For the purpose of illustration I have shown the ring of this invention in the accompanying drawings as associated with one of the conventional pistons commonly used in Ford engines. This piston forms no part of the present invention except in so far as it is modified to adapt my ring for use therewith. This modification consists in providing the base of the wiper ring groove 1 with a plurality of ducts 2 which extend from substantially the outer face of the piston through the wall of the skirt into the interior thereof as shown in Figure 1. These holes may be readily drilled in any conventional piston with ease and dispatch and through the provision of these holes the piston is adapted to receive the ring of this invention without further modification.

The present ring may be constructed of any suitable material and may be formed with a conventional or suitable joint. Inasmuch however as the jointing of the ring is optional, I have not shown any particular joint. The ring is made of sufficient depth to fit the ring groove 1 with the desired vertical clearance to which it may be fitted in the usual manner and is of the extensive type adapting it, through its own resiliency to bear against the cylinder wall. It is provided on its outer periphery and intermediate its upper and lower edges with a relatively narrow bearing surface 3.

Figure 3:
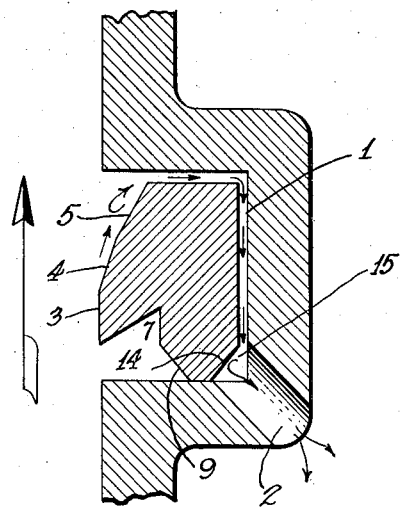
Figures 3 and 4 are fragmental sections of a piston with the ring therein. Of these views.

That portion of the ring above the bearing surface 3 is formed with a double bevel, the lower bevel being designated 4 and the upper bevel 5. It will be noted from the drawings and more especially from Figure 2 thereof that the lower bevel will make a relative acute angle with the piston wall while the upper bevel 5 will make a greater angle therewith. The advantage of this construction is that when the ring is moving toward the more pronounced bevel 5, it will squeeze the oil against the piston wall and smooth it out, while the following more acute bevel 4 will further smooth out the oil and leave it in the form of a thin filament to be traversed by the bearing portion 3. The surplus oil left after an efficient distribution of the lubricant over the cylinder wall will back up adjacent the portion 5, but is permitted to pass over the top edge and downwardly behind the ring as shown by the arrows in Figure 3, wherein the ring is shown as fitted to allow such passage. The lower inner edge of the ring is chamfered or beveled as shown at 14 to form an inner annular chamber 15 which is adapted to receive the oil thus passed and oil from this inner chamber is adapted to exit through the discharge ducts 2 and gravitate into the crank case. It will be noted from Figure 3 that during the up stroke the lower edge of the ring will engage the base of the groove 1 and thereby form a seal against by-passing of the oil.

The bearing portion 3 terminates at its lower edge into a substantially knife edge 6 which is formed by undercutting the portion 3 as shown at 7. Directly below this undercut portion the ring is of decreased thickness as shown at 8 and this portion of decreased thickness is beveled or chamfered as shown at 9. As a result of this construction of the lower portion of the ring, the downward travel of the ring will cause the knife edge 6 to scrape superfluous oil free from cylinder walls, so that a very thin filament is left thereon and just sufficient to properly lubricate the compression rings which are shown in the drawings and designated 11.

Oil scraped from the cylinder wall by the knife edge 6 during the down stroke is received within an annular channel or recess 12 positioned below the edge 6 and the cut away portion 7 and above the base of the ring groove 1. This chamber is relatively extensive adapting it to receive a fairly good supply of oil without clogging or fouling and this superfluous oil freely passes beneath the lower edge of the ring into the inner chamber 15 and is thence delivered to the ducts 2 into the interior of the piston skirt, whence it falls into the crank case, all as clearly shown by the arrows in Figure 4 of the drawings.

The holes 2 are in practice made sufficiently large so that they will not be apt to clog and the outer and inner annular chambers 12 and 15 are also sufficiently large so that fouling of the exit passages for the oil will not occur. Particular attention is called to the fact that the wiping edge 6 is positioned well above the lower edge of the ring in contradistinction to some prior constructions wherein the wiping edge is located at the lower edge of the ring. In such prior constructions, scale or other extraneous matter scraped from the cylinder walls rapidly accumulates and fouls the wiping edge to such extent as to preclude its proper functioning. With the ring of the present invention this cannot occur and the ring will properly fuction through long periods with high efficiency in the performance of its work.

Figure 4:
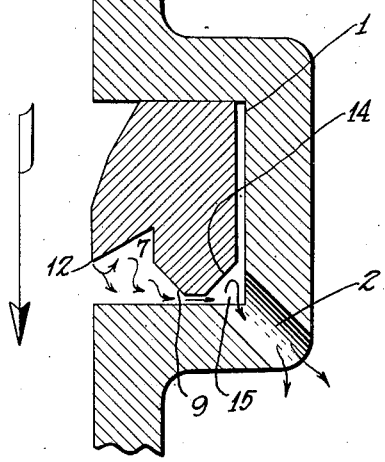

It will be noted from Figure 4 that during the down stroke the upper edge of the ring will tightly seat against the upper face of the ring groove and this being the case, there will be no chance for the oil wiped from the cylinder wall and entering the inner chamber to pass upwardly behind the ring and outwardly above the top thereof to be redeposited on the cylinder wall.

The drawings show the invention in its preferred practical form, but inasmuch as certain portions of the ring may be slightly changed in configuration without departing from the invention it is to be understood that the invention is fully commensurate with the appended claim.

Having thus fully described the invention, what I claim and desire to secure by Letters Patent is:

A piston ring provided on its outer periphery and intermediate its upper and lower edges with a relatively narrow bearing surface, that portion of the outer periphery of the ring above the bearing surface being cut away on two distinct bevels, the upper of which will make a greater angle with a cylinder wall than the lower, and that portion of the outer periphery of the ring below the bearing surface being cut away to form a relatively sharp wiping edge at the lower edge of the bearing surface, which wiping edge is positioned well above the plane of the lower edge of the ring and the lower edge of the ring being peripherally chamfered, whereby the chamfer and undercut provide a relatively extensive annular chamber to receive the oil wiped from the cylinder wall when the associated piston is descending.

In testimony whereof I have signed the foregoing specification.

JAMES BRUCE DAY.